United States Patent [19]

Sasaki et al.

[11] Patent Number: 5,041,928
[45] Date of Patent: Aug. 20, 1991

[54] APPARATUS FOR LOADING A TAPE ON A MAGNETIC HEAD DRUM OF A HELICAL SCANNING TYPE VIDEO TAPE RECORDER

[75] Inventors: Takashi Sasaki, Katsuta; Nobuyuki Kaku, Yokohama; Atsushi Inoue, Katsuta, all of Japan

[73] Assignee: Hitachi, Ltd., Tokyo, Japan

[21] Appl. No.: 422,499

[22] Filed: Oct. 17, 1989

[30] Foreign Application Priority Data

Oct. 21, 1988 [JP] Japan .................................. 63-263906
Feb. 10, 1989 [JP] Japan .................................... 1-29767

[51] Int. Cl.$^5$ ...................... G11B 5/027; G11B 5/008; G11B 15/60
[52] U.S. Cl. ......................................... 360/85; 360/95; 360/130.24
[58] Field of Search ...... 360/75, 95, 85, 130.2-130.24; 242/200, 198, 199

[56] References Cited

U.S. PATENT DOCUMENTS

| | | | |
|---|---|---|---|
| 4,122,506 | 10/1978 | Kubo et al. | 360/95 |
| 4,445,154 | 4/1984 | Kihara et al. | 360/95 |
| 4,692,824 | 9/1987 | Takahara et al. | 360/95 |
| 4,697,214 | 9/1987 | Sasakawa | 360/85 X |
| 4,928,191 | 5/1990 | Kaku et al. | 360/85 X |
| 4,939,606 | 7/1990 | Nakanishi | 360/107 X |

FOREIGN PATENT DOCUMENTS

| | | |
|---|---|---|
| 58-27580 | 6/1983 | Japan . |
| 62-165761 | 7/1987 | Japan .................................... 360/85 |
| 63-69055 | 3/1988 | Japan . |

Primary Examiner—Aristotelis M. Psitos
Assistant Examiner—Alfonso Garcia
Attorney, Agent, or Firm—Antonelli, Terry, Stout & Kraus

[57] ABSTRACT

A tape loading apparatus comprising a cassette including a videotape received in the cassette, with a longitudinal axis of the received tape forming a tape datum plane in the cassette. A helical scanning type magnetic head drum is provided having a cylindrical head drum surface and a lead edge, with the tape being set on the cylindrical head drum surface for scanning. The lead edge maintains the lead angle between the tape and the magnetic head drum and limits the vertical movement of tape on the cylindrical head drum surface. A tape-drum contacting axis is a contacting line at which the longitudinal axis of the tape set along the lead edge contacts with the cylindrical head drum surface after the tape setting operation on the cylindrical head drum surface is completed with both of the longitudinal ends of the tape-drum contacting axis being arranged substantially on a plane parallel to the tape datum plane. A tape setting device draws out the tape from the cassette, guides the tape along the lead edge and sets the tape on the cylindrical head drum surface for scanning the tape, so that damage to the tape is prevented.

5 Claims, 24 Drawing Sheets

F I G. 11
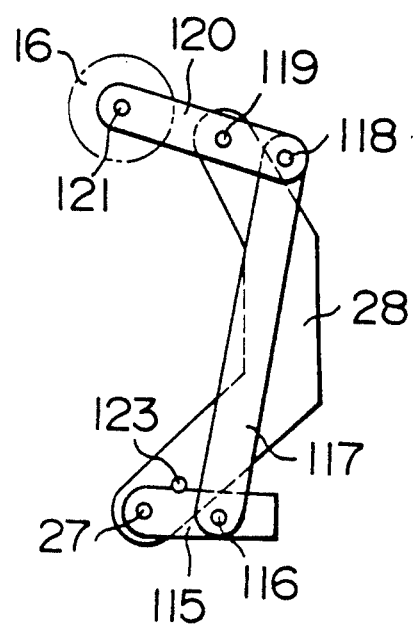
F I G. 12
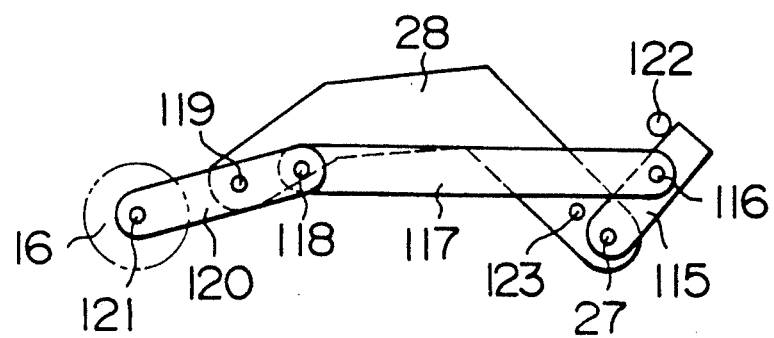

F I G. 29
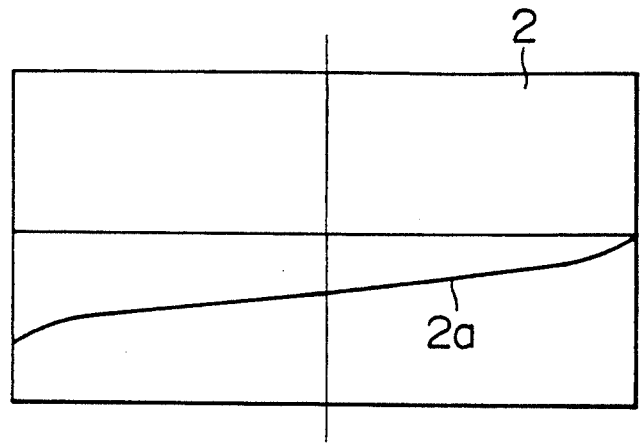
F I G. 30
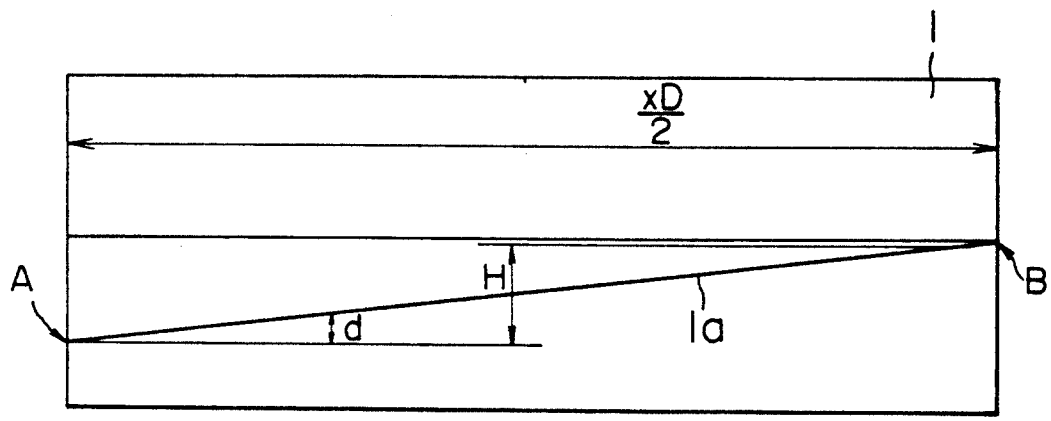
F I G. 31
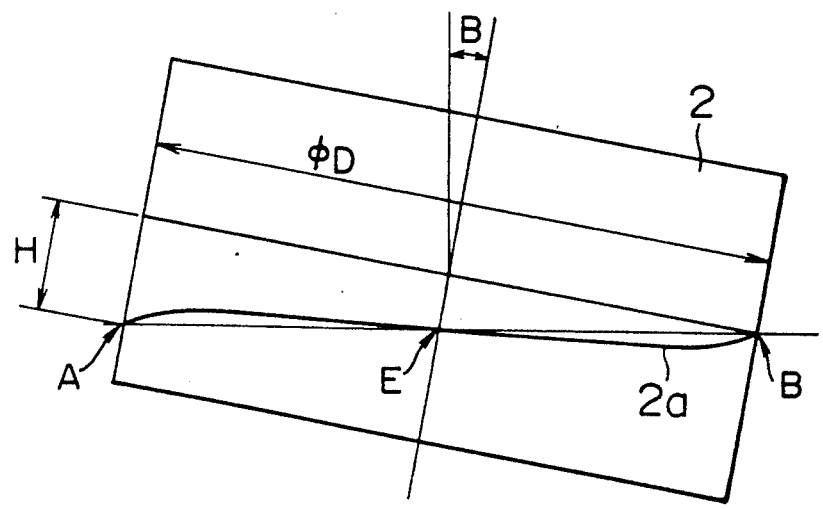

APPARATUS FOR LOADING A TAPE ON A MAGNETIC HEAD DRUM OF A HELICAL SCANNING TYPE VIDEO TAPE RECORDER

BACKGROUND OF THE INVENTION

The present invention relates to an apparatus for loading a tape on a magnetic head drum of helical scanning type videotape recorder.

A conventional helical scanning type videotape recorder as shown, for example, in Japanese Patent Examined Publication No. 58-27580 includes a tape loading structure in which the height of tape in a tape cassette is identical with the height of tape on an inclined guide moving parallel with the tape cassette base surface to load the tape onto the magnetic head drum. In this structure, there is possibility of that the tape edge contacts with an edge of lead on the magnetic head drum and the tape edge is damaged by the edge of lead, since the lead edge is not parallel to the tape edge loaded on the magnetic head drum through the tilted guide.

Another conventional helical scanning type videotape recorder as shown in Japanese Patent Unexamined Publication No. 63-69055 includes slide bases each having a tilted guide and a sliding tape guide, and the slide bases slide around the magnetic head drum to load the tape onto the magnetic head drum. In this structure, there is possibility of that the attitude and position of tape on the tilted guide and sliding tape guide vary more than a predetermined degree so that the positional relation between the tape and the lead on the magnetic head drum is not limited within a suitable range. Therefore, the lead edge sometimes damages the tape and the tape sometimes damages the magnetic heads.

OBJECT AND SUMMARY OF THE INVENTION

The object of the present invention is to provide a tape loading apparatus for loading a tape on a magnetic head drum of helical scanning type videotape recorder, in which the damages of tape and magnetic head surfaces are prevented.

The tape loading apparatus according to the present invention, comprising, a cassette including a videotape received in the cassette, the longitudinal axis of the received tape forming a tape datum plane in the cassette, a helical scanning type magnetic head drum having a cylindrical head drum surface and a lead edge, the tape being set on the cylindrical head drum surface for scanning, the lead edge maintaining the lead angle between the tape and the magnetic head drum and limiting the vertical movement of tape o the cylindrical head drum surface, a tape-drum contacting axis being a contacting line at which the longitudinal axis of the tape set along the lead edge contacts with the cylindrical head drum surface after the tape setting operation on the cylindrical head drum surface is completed, both of the longitudinal ends of the tape-drum contacting axis arranged substantially on a plane parallel to the tape datum plane, a tape setting device drawing out the tape from the cassette, guiding the tape along the lead edge and setting the tape on the cylindrical head drum surface for scanning the tape.

In the tape loading apparatus according to the present invention, since both of the longitudinal ends of the tape-drum contacting axis are arranged substantially on a plane parallel to the tape datum plane as described above, the positional variation of tape on the cylindrical head drum surface in the direction perpendicular to the tape datum plane is small, so that it is not necessary for the tape to be moved large in the direction perpendicular to the tape datum plane when guiding the tape along the lead edge. Therefore, the attitude of tape stabilizes on the tape setting device, so that the tape is guided correctly along the lead edge on the cylindrical head drum surface. As a result of guiding correctly the tape, the tape is prevented from covering on the lead edge and from being damaged by the lead edge.

BRIEF DESCRIPTION OF THE DRAWINGS

FIG. 11 is a plane view showing a driving mechanism for a pinch roller which presses the tape against a capstan roller, in a condition after the completion of tape setting operation.

FIG. 12 is a plane view showing a driving mechanism for a pinch roller which presses the tape against a capstan roller, in a condition before the start of tape setting operation.

FIG. 29 is a plane view showing a lead edge of magnetic head drum.

FIG. 30 is a development showing a lead edge on a cylindrical surface of magnetic head drum.

FIG. 31 is a plane view showing a lead edge of an inclined magnetic head drum.

DETAILED DESCRIPTION OF PREFERRED EMBODIMENT

Figure 1:
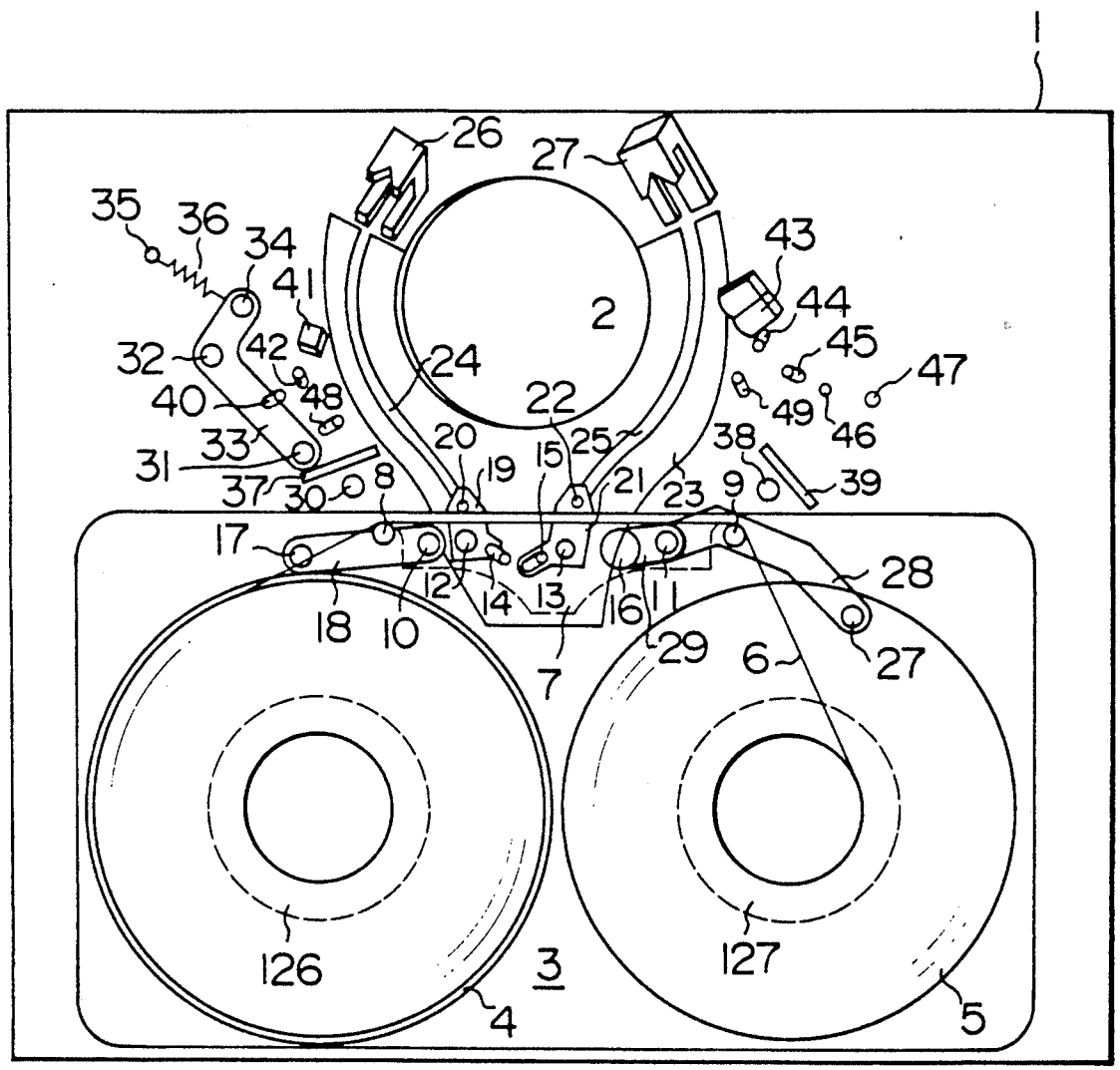
FIG. 1 is a plane view showing a tape loading apparatus before the tape setting operation is started.

In FIG. 1, an inclined magnetic head drum 2 is mounted on a chassis 1. The magnetic head drum 2 has a rotating magnetic head. A cassette 3 has a tape supplying reel 4 and a tape pulling reel 5 for receiving the predetermined amount of a tape 6. Both ends of the tape 6 are connected to the respective reels through leader tapes. The cassette 7 has a cassette opening 3 over which the tape 6 extends. When the cassette 3 is attached on the chassis 1 as shown in FIG. 1, tape guides 10 and 11, sliding tape guides 12 and 13, tilted guides 14 and 15, and a pinch roller 16 are inserted in the cassette opening 7. The tape guide 10 is mounted on an end of an arm 18 which is rotatable on a shaft 17 attached to the chassis 1. The sliding tape guide 12 and the tilted guide 14 are mounted on a slide base 19 with the predetermined positional relation therebetween. The slide base 19 also has a positioning pin 20 at a forward end thereof. The sliding tape guide 13 and the tilted guide 15 are mounted on a slide base 21 with the predetermined positional relation therebetween. The slide base 21 also has a positioning pin 22 at a forward end thereof. By driving mechanisms described below, the slide bases 19 and 21 are moved along guide grooves 24 and 25 of a guide plate 23 fixed on the chassis 1, respectively. The positioning members 26 and 27 are arranged in the vicinities of the forward ends of guide grooves 24 and 25, respectively. The tape guide 11 is mounted on an end of an arm 28 which is rotatable on a shaft 27 attached to the chassis 1. An end of an arm 29 is rotatable on the axis of the tape guide 11, and the pinch roller 16 is mounted on another end of the arm 29.

Figure 2:
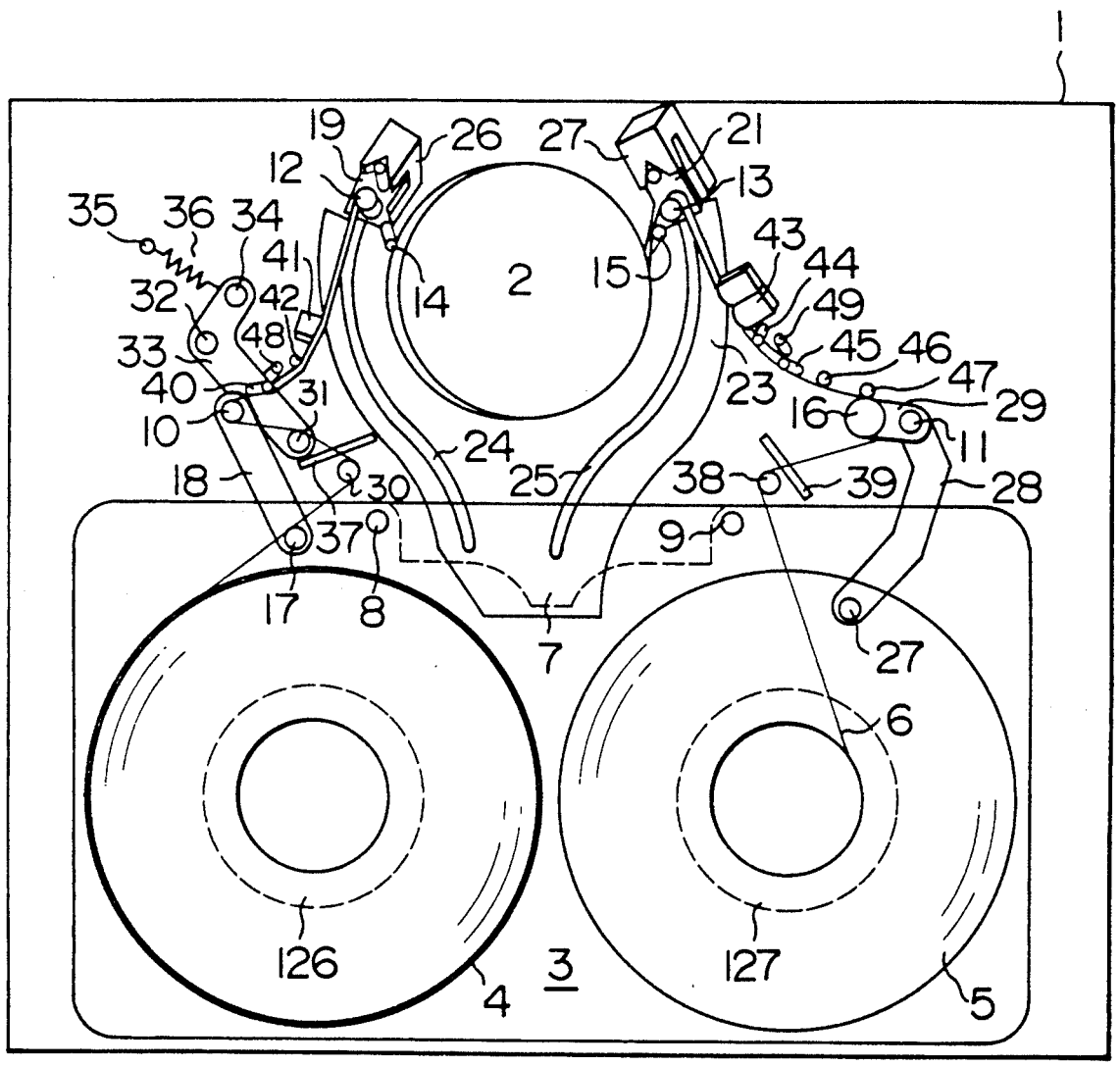
FIG. 2 is a plane view showing a tape loading apparatus after the tape is set on a cylindrical head drum surface.
Figure 3:
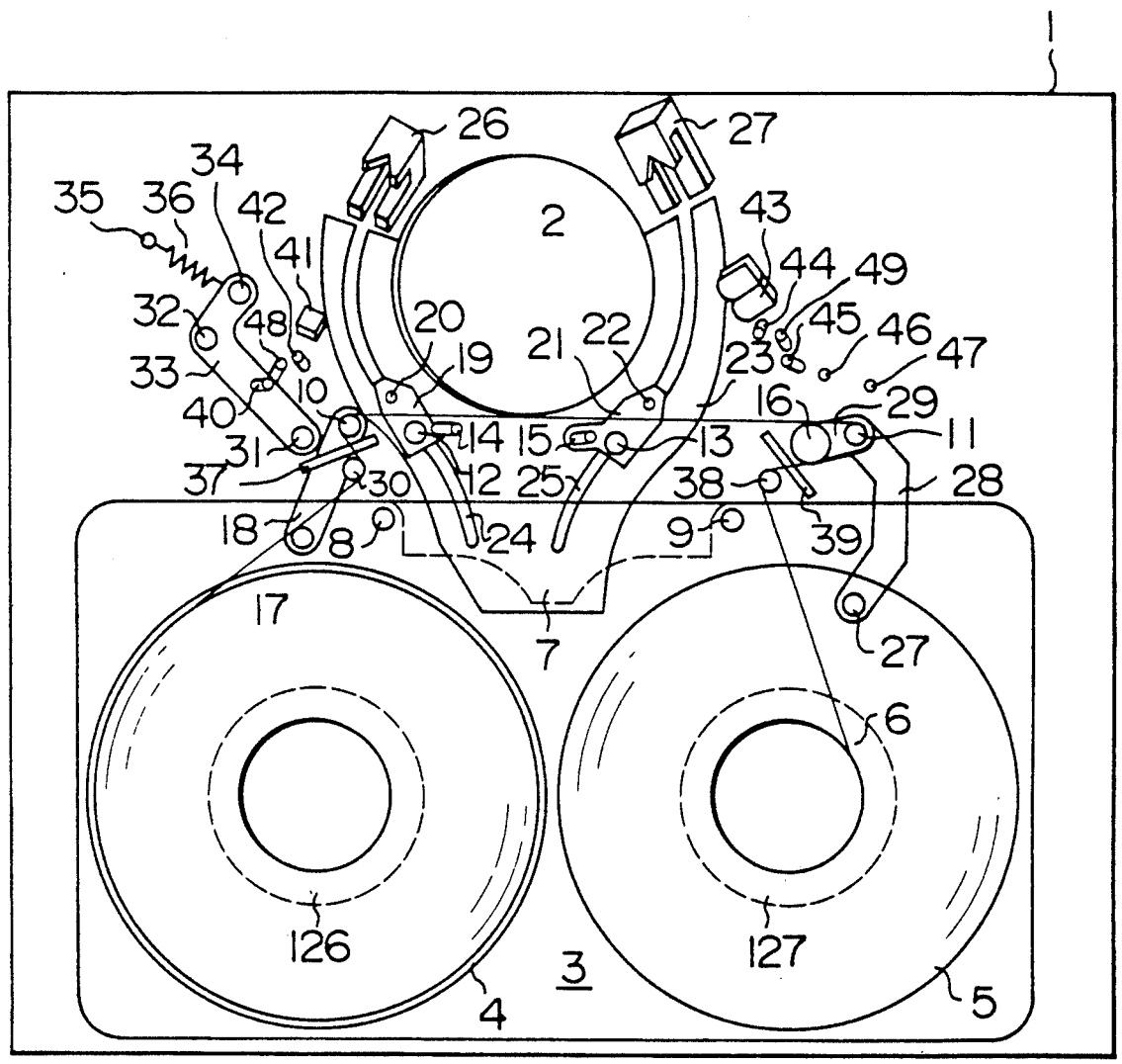
FIG. 3 is a plane view showing a tape loading apparatus during the tape setting operation.

In FIGS. 2 and 3, in a tape loading operation, the tape guide 10 on the arm 18 rotates around the shaft 17 to draw out the tape 6 of tape supplying side from the cassette 3 and the drawn out tape 6 contacts with a guide 30 and a tension pin 31 in the vicinity of the tape supplying reel 4. The tension pin 31 is mounted on an end of an arm 33 which is rotatable on a shaft 32. A shaft 34 fixed on another end of the arm 33 is pulled through a spring 36 toward a pin 35 fixed on the chassis 1, so that the arm 33 is pulled in the counterclockwise direction. An end-tape (leader tape) detector 37 is arranged in a tape path between the guide 30 and the tension pin 31. The tape guide 11 on the arm 28 rotates around the shaft 27 to draw out the tape 6 of tape pulling side from the cassette 3. The pinch roller 16 is arranged in the vicinity of the tape guide 11 and the movement of the pinch roller 16 is described below. The tape 6 drawn out by the tape guide 11 contacts with a guide 38 in the vicinity of the tape pulling reel 5. An end-tape (leader tape) detector 39 is arranged in a tape path near the guide 38. The slide bases 19 and 21 move along the guide grooves 24 and 25 to guide the tape 6 onto the magnetic head drum 2 and subsequently are fixed on the positioning members 26 and 27 so that the tape 6 is set on the magnetic head drum 2. Since the guide plate 23 curves vertically, the vertical position of the slide base 19 on the positioning member 26 is lower than that of the slide base 19 in the cassette 3 and the vertical position of the slide base 21 on the positioning member 27 is higher than that of the slide base 21 in the cassette 3. A fixed inclined guide 40, a fixed head 41 and a fixed guide 42 are arranged in a tape path between the tape guide 10 and the sliding tape guide 12. The fixed inclined guide 40 guides the tape of tape supplying side between the tape guide 10 and the sliding tape guide 12 which is inclined in comparison with the tape guide 10 and whose vertical position is different from that of the tape guide 10. The fixed guide 42 guides the tape 6 onto the fixed head 41. The fixed head 41 can erase record signals over the width of tape. The sliding tape guide 12 changes the tape path direction and the tilted guide 14 guides the tape 6 smoothly onto the magnetic head drum 2. In the tape path between the sliding tape guide 13 and the tape guide 11, an A/C head 43, a fixed guide 44, a fixed inclined guide 45, a guide 46 and a capstan 47 are arranged. The A/C head 43 can record and reproduce audio signals and control signals for controlling the tape-feed. The fixed guide 44 guides the tape 6 onto the A/C head 43. The fixed inclined guide 45 changes the tape attitude so that the tape 6 is guided from the magnetic head drum 2 to the tape pulling reel 5. The guide 46 guides the tape 6 onto the A/C head 43 and the capstan 47. The capstan 47 is driven by a motor arranged under the capstan 47. The tape 6 is nipped by the pinch roller 16 and the capstan 47 and fed in accordance with the rotation of the capstan 47. The tilted guide 15 changes the attitude of the tape 6 in the vicinity of the drum 2 so that the tape 6 is guided through the fixed inclined guide 45 to the cassette 3 whose vertical position is different from that of the cassette 3.

The tape attitude compensating guides 48 and 49 do not contact with the tape 6 when the tape 6 is not drawn out from the cassette 3 and after the tape 6 is loaded on the magnetic head drum 2. When the tape 6 is drawn out by the sliding tape guides 12, 13 and the tilted guides 14, 15 from the cassette 3 to be loaded on the magnetic head drum 2, the tape attitude compensating guides 48 and 49 contact with the tape 6 and stabilize the tape attitude which varies because of the variation of vertical position of the tape 6 guided onto the magnetic head drum 2. Therefore, the tape 6 is correctly guided onto the magnetic head drum 2.

When the tape 6 is drawn out from the cassette 3, the tape guides 10 and 11 for drawing out the tape 6 from the cassette 3 pass near the end-tape detectors 37 and 39, respectively, and the end-tape detector 37 can detect the end-tape drawn out from the tape supplying reel 4 and the end-tape detector 39 can detect the end-tape drawn out from the tape pulling reel 5. In the structure shown in FIG. 3, when the end-tape detector 37 and 39 can not detect the end-tape, the tape 6 does not contact with the magnetic head drum 2, the sliding tape guides 12, 13 and the tilted guides 14, 15.

Figure 4A:
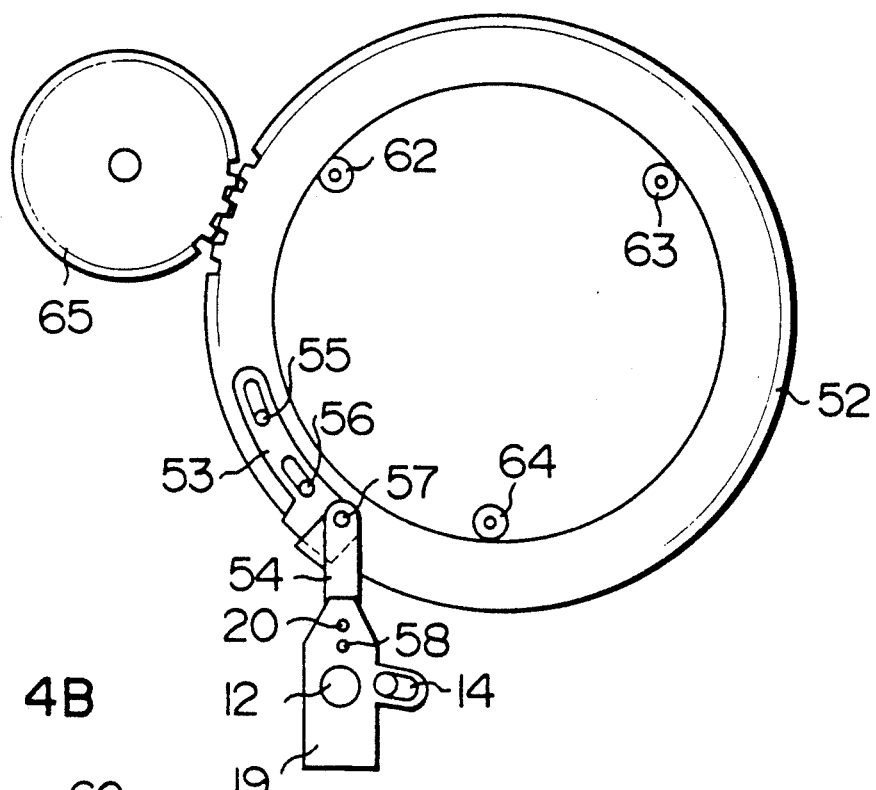
FIG. 4A is a plane view showing a slide base driving mechanism of tape supplying side.

In FIG. 4A showing a slide base driving mechanism of tape supplying side, An annular loading ring 52 is supported by rotatably rollers 62, 63 and 64 contacting with an inner periphery of the ring 52. The axis of the loading ring 52 is identical with that of the magnetic head drum 2. The loading ring 52 is driven through a rotational gear 65 by a driving source. A slider 53 is guided by shafts 55 and 56 on the loading ring 52. A shaft 57 is fixed on an upper portion of the slider 53 extending upwardly. An end of a rotatable arm 54 is supported by the shaft 57. Another end of the rotatable arm 54 has a shaft 58 through which the arm 54 is swingably connected to the slide base 19. The slider 53 is pulled by a spring (not shown) in the circumferential direction on the loading ring 52 so that the loading ring 52 pulls the slide base 19 through the spring when the slide base 19 is set in the positioning member 26.

Figure 4B:
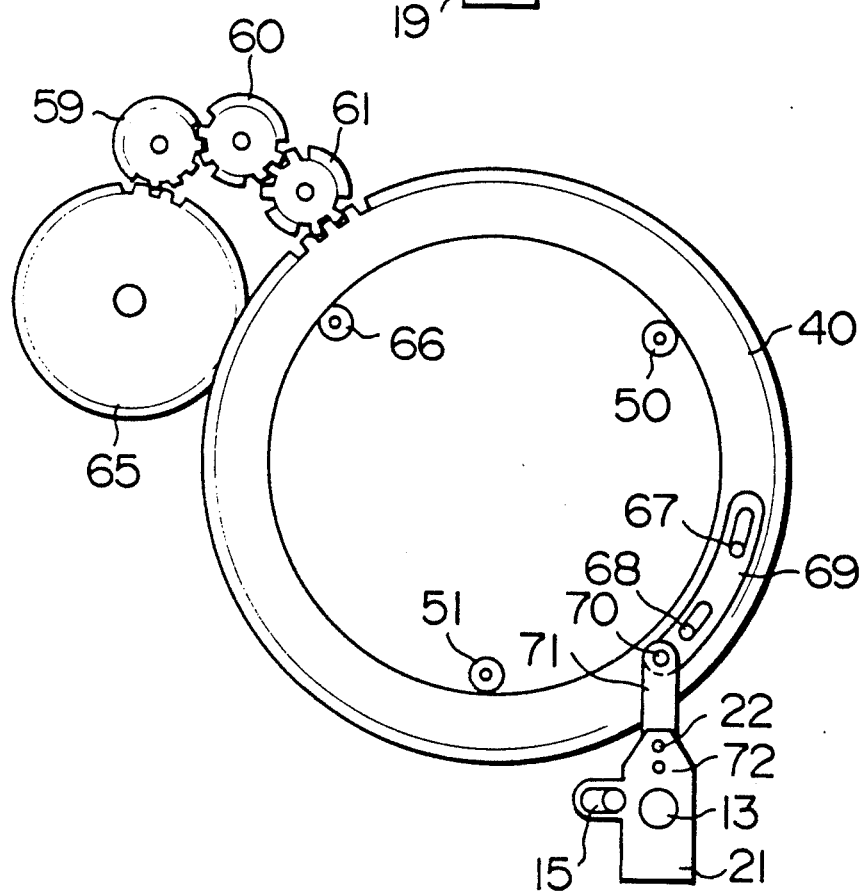
FIG. 4B is a plane view showing a slide base driving mechanism of tape pulling side.

In FIG. 4B showing a slide base driving mechanism of tape pulling side, an annular loading ring 40 is supported by rotatable rollers 50, 51 and 66 contacting with an inner periphery of the ring 40. The loading ring 40 is arranged above the loading ring 52 and the axis of the loading ring 40 is identical with that of the magnetic head drum 2. The loading ring 40 is driven by the gear 65 through a gear train composed of gears 59, 60 and 61. The rotational direction of the loading ring 40 is opposed to that of the loading ring 52. A slider 69 is guided by the shaft 67 and 68 on the loading ring 40. An arm 71 is swingably connected to the slider 69 through a shaft 70 fixed on an end of the slider 69 and also is swingable connected to the slide base 21 through a shaft 72. The slider 59 is pulled by a spring (not shown) in the circumferential direction on the loading ring 40 so that the loading ring 40 pulls the slide base 21 through the spring when the slide base 21 is set in the positioning member 27.

Figure 5A:
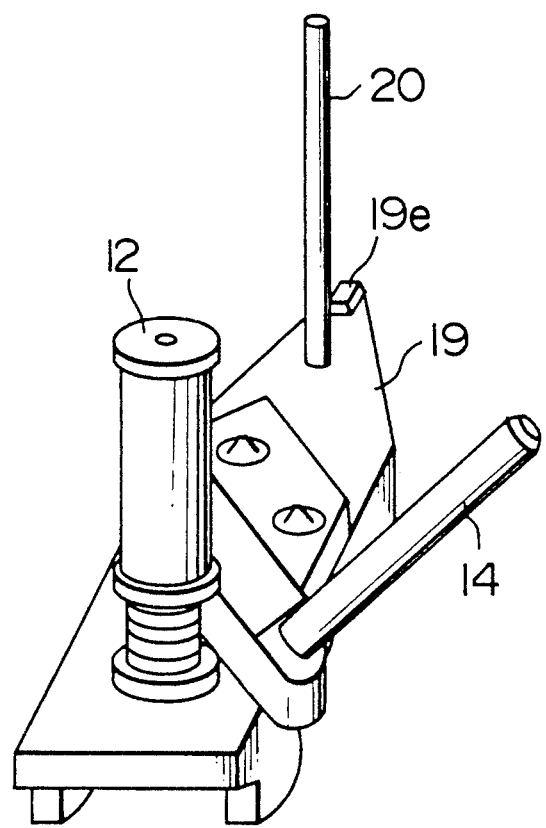
FIG. 5A and FIG. 5B are perspective views showing a slide base of tape supplying side.
Figure 5B:
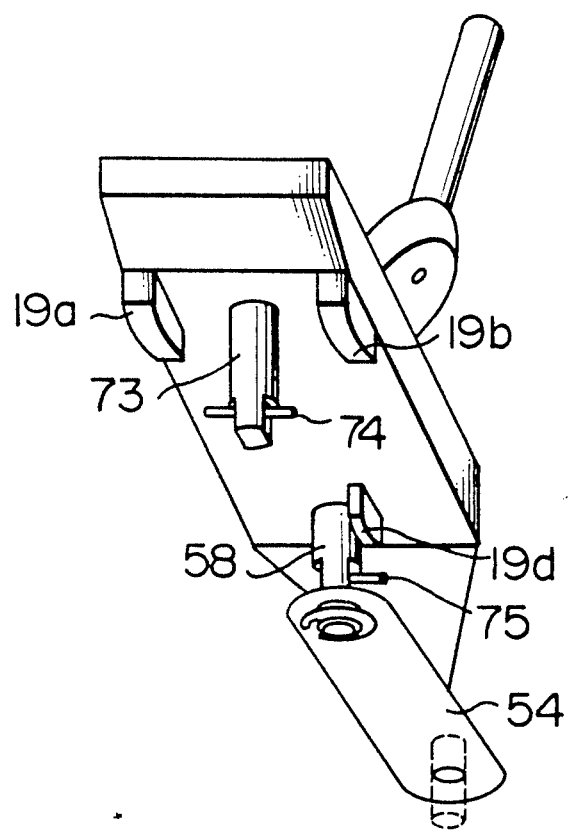
Figure 6A:
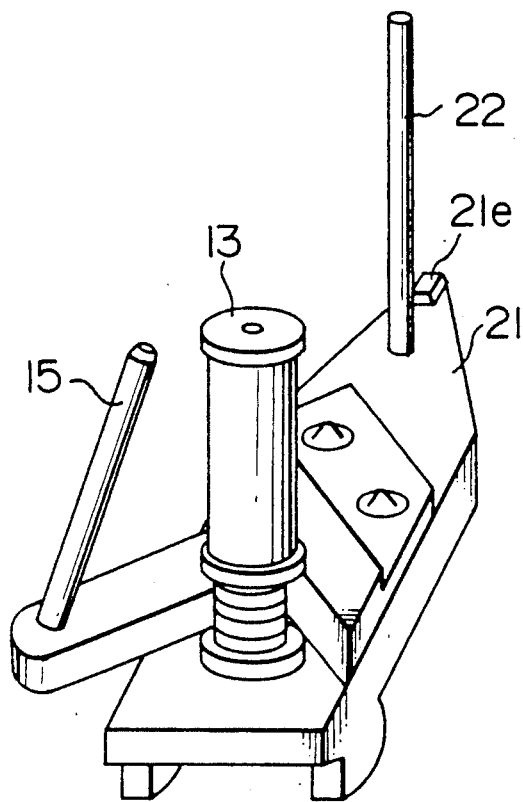
FIG. 6A and FIG. 6B are perspective views showing a slide base of tape pulling side.
Figure 6B:
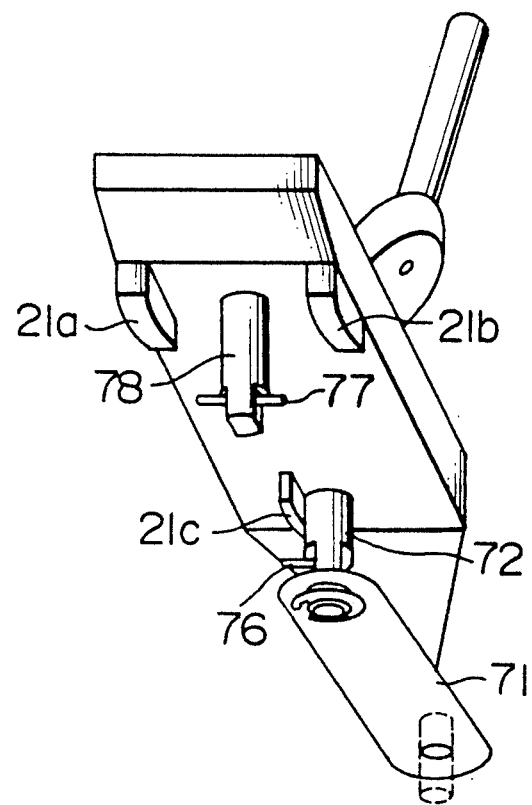

In FIGS. 5A and 5B showing the slide base 19, the sliding tape guide 12, the tilted guide 14 and a pin 20 are mounted on the slide base 19. In FIGS. 6A and 6B showing the slide base 21, the sliding tape guide 13, the tilted guide 15 and a pin 22 are mounted on the slide base 21. The slide base 19 has projections 19a, 19b and 19d which slide on the guide plate 23. The slide base 19 also has shafts 73 and 58. The shaft 73 has a pin 74 and the shaft 58 has a pin 75. The guide plate 23 is arranged between the projections 19a, 19b and the pin 74 and between the projection 19d and the pin 75. The shaft 58 supports swingably the arm 54 through which the shaft 58 is connected to the shaft 57 fixed on the slider 53. The slide base 21 also has shafts 72 and 78. The shaft 78 has a pin 77 and the shaft 72 has a pin 76. The guide plate 23 is arranged between the projections 21a, 21b and the pin 77 and between the projection 21c and the pin 76. The shaft 72 supports swingably the arm 71 through which the shaft 72 in connected to the shaft 70 fixed on the slider 69.

Figure 7:
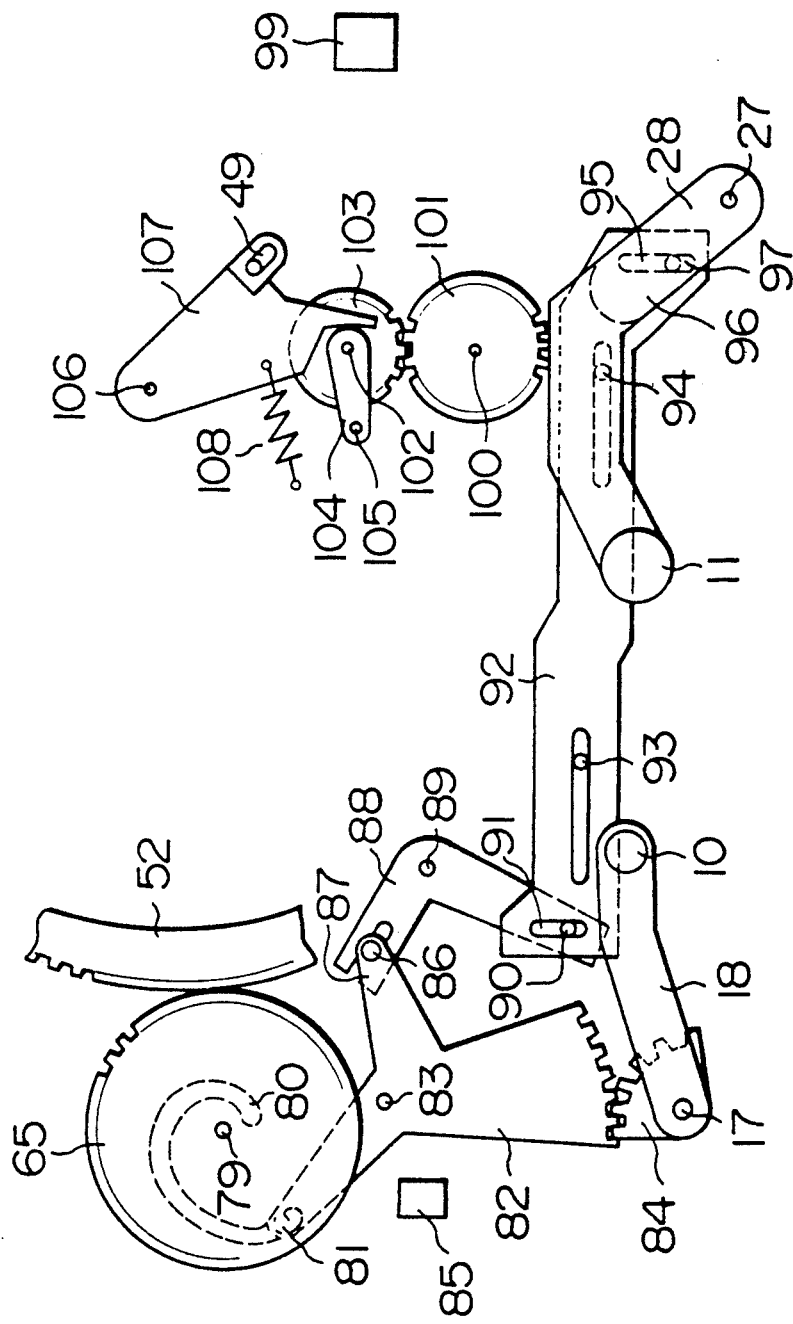
FIG. 7 is a plane view showing a mechanism for drawing out the tape from the cassette, in a condition before the start of tape setting operation.
Figure 8:
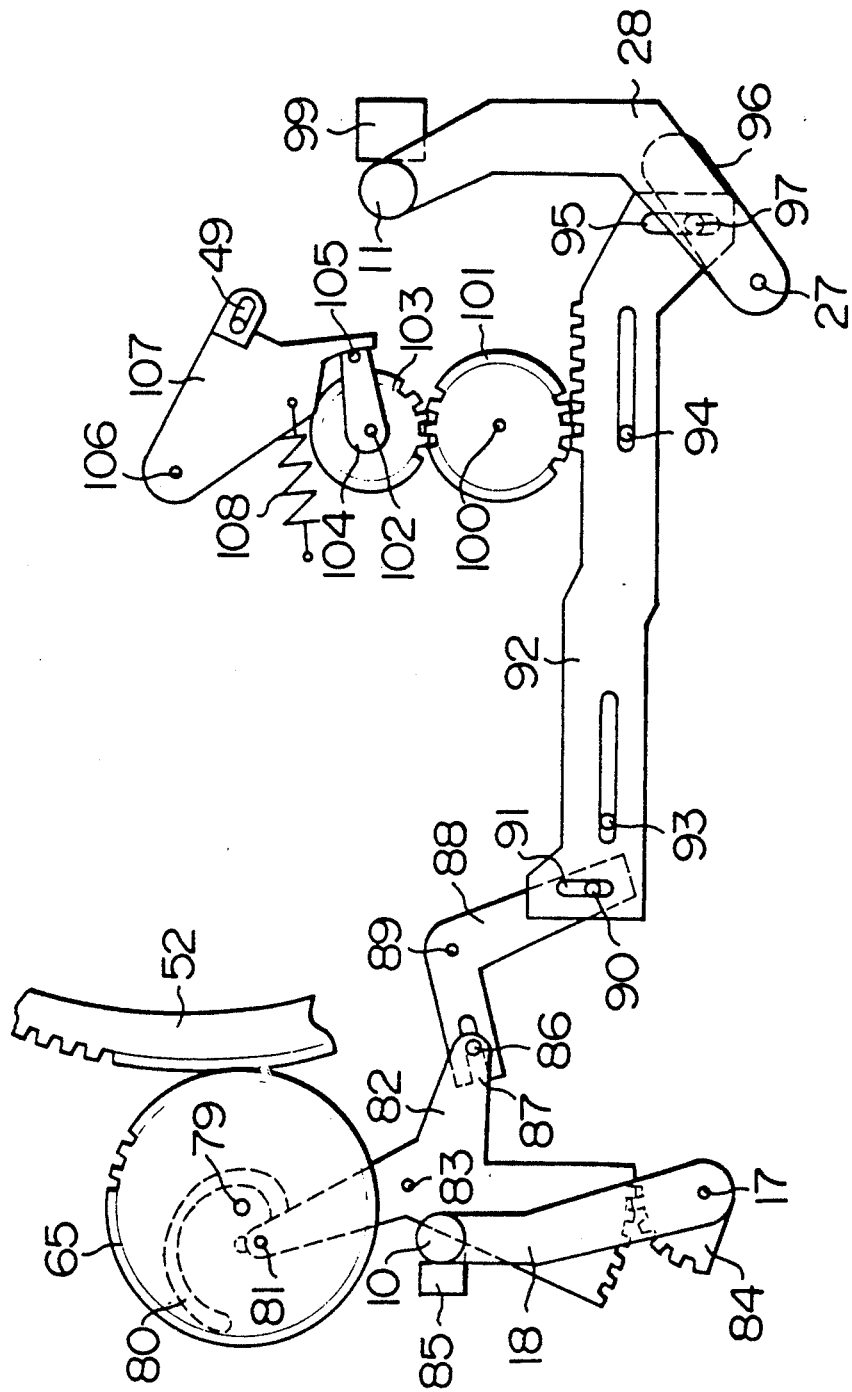
FIG. 8 is a plane view showing a mechanism for drawing out the tape from the cassette, in a condition after the completion of tape setting operation.

In FIGS. 7 and 8, a mechanism for driving the tape gides 10 and 11 is shown. The lower surface of the gear 65 for driving the loading ring 52 has a cam groove 80 as shown in FIGS. 7 and 8. The cam groove 80 engages with a pin 81 fixed on an end of an arm 82 which is rotatable on a shaft 83. When the gear 65 rotates on the shaft 79, the arm 82 swings on the shaft 83. Another end of the arm 82 has a gear portion which engages with a gar 84 supported swingably on the shaft 17. Through a spring (not shown) the gear 84 pulls the arm 18 which is supported swingably on the shaft 17 and whose movable range is limited by the limiting member 85. When the gear 84 is rotated from the position shown in FIG. 7 (start position of loading) to the position shown in FIG. 8 (completion position of loading) and the arm 18 contacts with the limiting member 85, the arm 18 is pulled through the spring by the gear 84. The other end of the arm 82 has a pin 86 which engages with a groove 87 arranged at an end of an arm 88. The arm 88 is swingably supported on a shaft 89. Another end of an arm 88 has a pin 90 which engages with a long groove 91 arranged at an end of a slider 92. The slider 92 is guided by shafts 93 and 94 so that the slider 92 can slide. Another end of the slider 92 has a long groove 95 which engages with a pin 97 fixed on an arm 96. The long grooves 91 and 95 extend in the direction perpendicular to the slide direction of the slider 92. The arm 96 is swingably supported on a shaft 27. An arm 28 is also swingably supported on a shaft 27 and is connected through a spring (not shown) to the arm 96 so that the arm 28 is pressed against a limiting member 99 through the spring when the gear 65 is rotated and the arm 96 is swung toward the limiting member 99.

The slider 92 has a gear portion engaging with a gear 101 which is rotatable on a shaft 100 and which engages with a gear 103. The gear 103 is rotatable on a shaft 102. An arm 104 is fixed on an upper surface of the gear 103. A pin 105 is fixed on an end of the arm 104. A compensating guide 49 of tape pulling side is fixed on an end of an arm 107 which is swingable on a shaft 106. Another end of the arm 107 has a cam portion which is pressed against the arm 104 by a spring 108 as shown in FIG. 7 so that the movement of the compensating guide 49 is controlled. When the slider 92 is moved to the position shown in FIG. 8, the gear 103 is rotated through the gear 101 and the pin 5 moves the arm 107 pulled by the spring 108. As shown in FIG. 7, the arm 107 contacts with a cylindrical cam surface of the arm 104 and the compensating guide 49 is not driven through the pin 105, until the predetermined amount of the tape 6 is drawn out from the cassette 3. When the tape 6 is set on the magnetic head drum 2 and the cam portion of the arm 107 contacts with the pin 105, the compensating guide 49 is arranged out of the tape path so that the guides 40 and 42 guide the tape instead of the compensating guide 49, as shown in FIG. 2.

Figure 9:
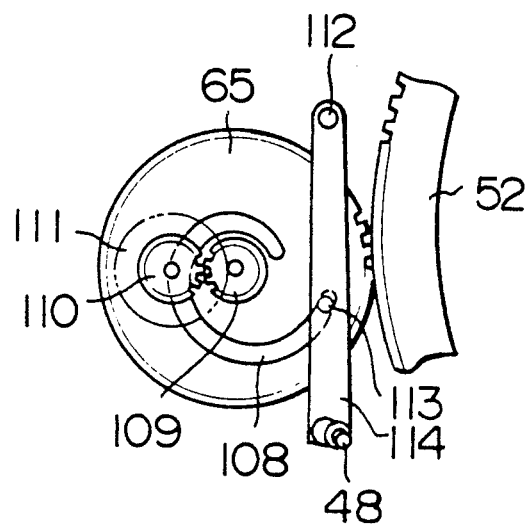
FIG. 9 is a plane view showing a compensating guide driving mechanism of tape supplying side, in a condition before the start of tape setting operation.
Figure 10:
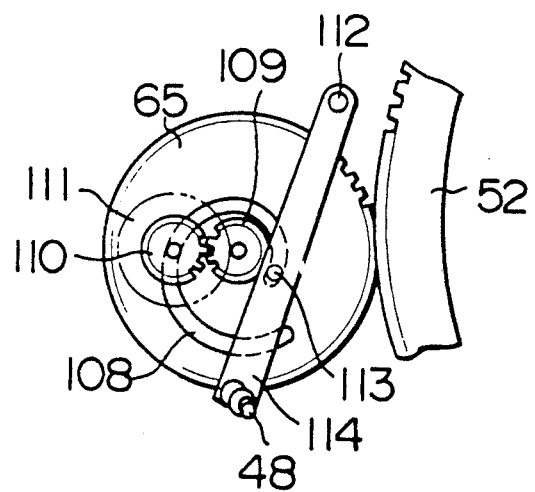
FIG. 10 is a plane view showing a compensating guide driving mechanism of tape supplying side, in a condition after the completion of tape setting operation.

In FIGS. 9 and 10, a mechanism for driving the compensating guide 48 of tape supplying side is shown. The compensating guide 48 is arranged between the tape guide 10 and the slide base 19. An upper surface of the gear 65 has a groove 108 which engages with a pin 113 fixed on an arm 114. The arm 114 is swingably supported on a shaft 112. The compensating guide 48 mounted on an end of the arm 114 is driven in accordance with the space of the groove 108. Until the predetermined amount of the tape 6 is drawn out from the cassette 3, the pin 113 is guided in the outer circumferential part of the groove 108. The outer circumferential part of the groove 108 has a constant distance between the axis of the shaft 112 and the outer circumferential part, so that the compensating guide 48 is not moved by the rotation of the gear 65. When the tape 6 is set on the magnetic head drum 2 and the pin 113 is guided in the inner circumferential part of the groove 108, the compensating guide 48 is arranged out of the tape path so that the guides 44, 45 and 46 guide the tape instead of the compensating guide 48, as shown in FIG. 2.

Figure 27:
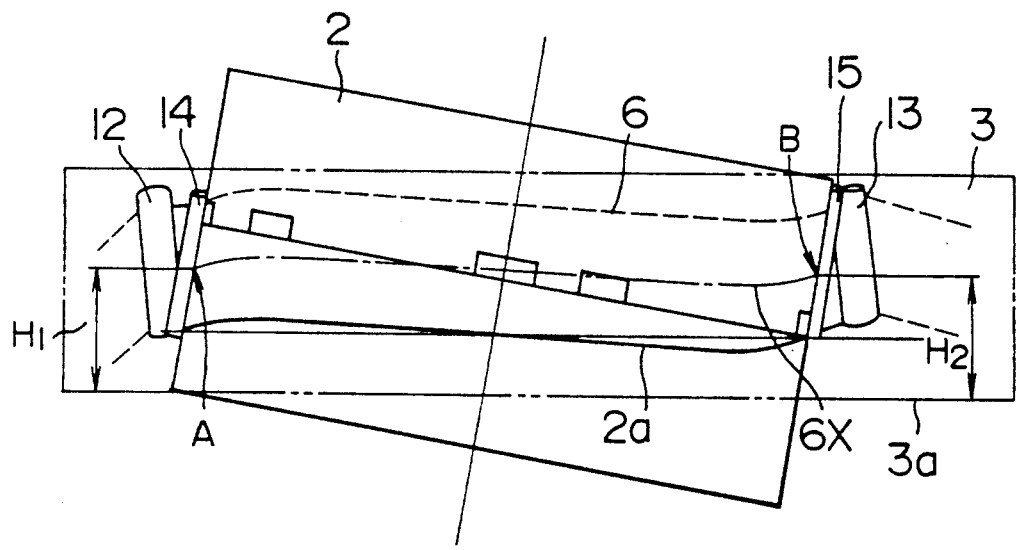
FIG. 27 is a plane view showing a tape arrangement on a magnetic head drum of tape loading apparatus, according to the present invention.
Figure 34:
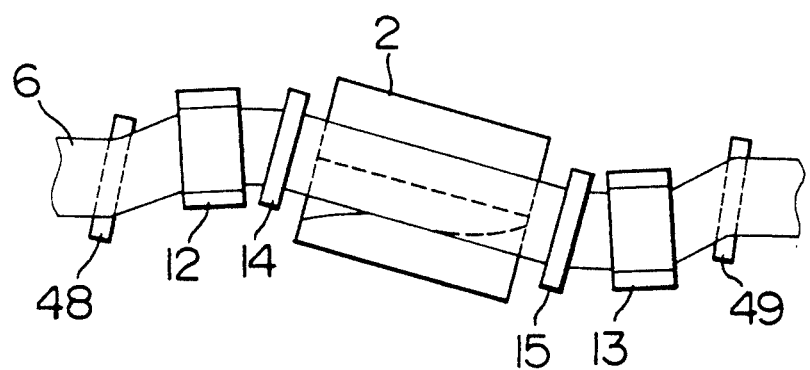
FIG. 34 is a schematic view showing an arrangement of compensating guides.
Figure 35:
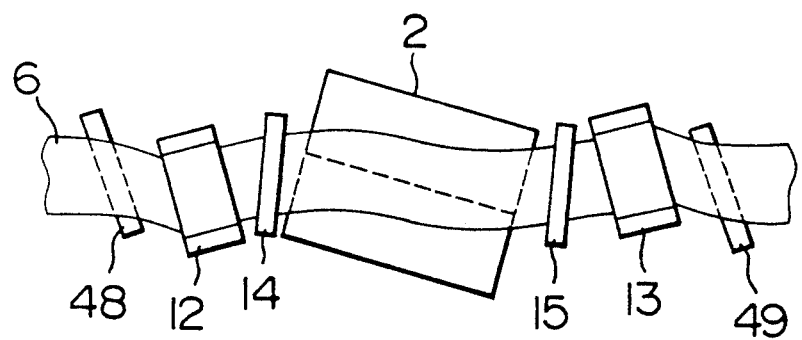
FIG. 35 is a schematic view showing an arrangement of compensating guides.

When the slide bases 19 and 21 move for guiding the tape 6 along a lead edge 2a, the attitudes and vertical positions of tape at the sliding tape guides 12 and 13 are different from the attitude and vertical position of tape in the cassette 3 as shown in FIGS. 34 and 35, because the lead edge 2a extends in a wave-shape manner as shown in FIG. 27.

Figure 36:
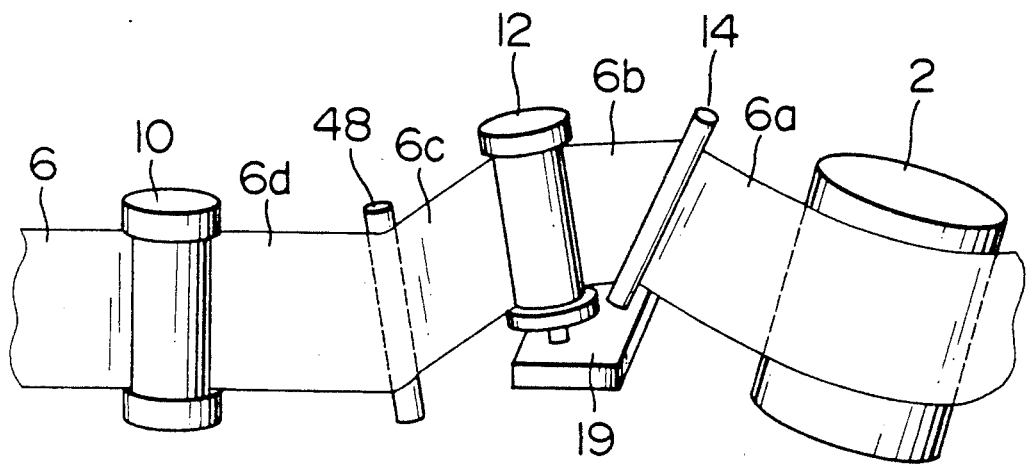
FIG. 36 is a schematic view showing an arrangement of compensating guides.

The slide bases 19 and 21 are guided by the guide plate 23 as shown in FIGS. 13A, 13B, 14A and 14B so that the attitudes and vertical positions of the slide bases 19 and 21 are varied. Therefore, tape parts 6a between the magnetic head drum 2 and the tilted guides 14, 15 mounted on the slide bases 19, 21 form respective planes without twist of tape and tape parts 6b between the sliding tape guides 12, 13 and the tilted guides 14, 15 extend perpendicularly to the axes of the sliding tape guides 12, 13, respectively, as shown in FIG. 36. Since the attitudes and vertical positions of the slide bases 19 and 21 are varied and the attitudes and vertical positions of tape at the sliding tape guides 12, 13 are different from those of tape in the cassette 3, the tape 6 between the tape guides 10, 11 and the sliding tape guides 12, 13 are guided by the compensating guides 48 and 49 whose attitudes are varied in accordance with the positions of the sliding tape guides 12, 13. Therefore, tape parts 6c between the compensating guides 48, 49 and the sliding tape guides 12, 13 and tape parts 6d between the compensating guides 48, 49 and the tape guides 10, 11 form respective planes without twist of tape and tape parts 6d extend perpendicularly to the axes of the tape guides 10, 11, respectively, as shown in FIG. 36.

As shown in FIGS. 9 and 10, a gear 109 fixed coaxially on the gear 65 drives a gear 110 connected to a positional sensor 111 for measuring the rotational degree of the gear 65, that is, the positions of the sliders 19 and 21.

As shown in FIGS. 11 and 12, a shaft 119 is fixed on an end of the arm 28. An arm 120 is swingably supported on the shaft 119 and is pulled by a spring (not shown) in the anticlockwise direction. The pinch roller 16 is supported through a shaft 121 on an end of the arm 120 and rotatable on the shaft 121. A shaft 118 is fixed on another end of the arm 120. An end of an arm 117 is swingably supported through the shaft 118 on the arm 120. Another end of the arm 117 is swingably supported through a shaft 116 on the arm 115. When the tape 6 is set completely on the magnetic head drum 2, as shown in FIG. 11, the arm 117 is pulled upwardly by the spring so that the arm 115 is rotated in the counterclockwise direction. Since the rotation of the arm 115 is limited by a pin 123 fixed on the arm 28, the positional relation between the pinch roller 16 and the arm 28 is maintained at the predetermined condition. When the arm 28 is moved from the position shown in FIG. 11 to the position at which all the tape 6 is received in the cassette 3, as shown in FIG. 12, the arm 115 engages with a stopper 122 at the predetermined position. After the engagement of the arm 115 and the stopper 122, the engagement of the arm 115 and the pin 123 is released and the arm 117 is pulled by the shaft 116 fixed on the arm 115. The arm 120 is rotated by the arm 117 so that the pinch roller 16 and the tape guide 11 mounted on the shaft 119 are moved to the predetermined position in the opening 7 of the cassette 3.

Figure 13A:
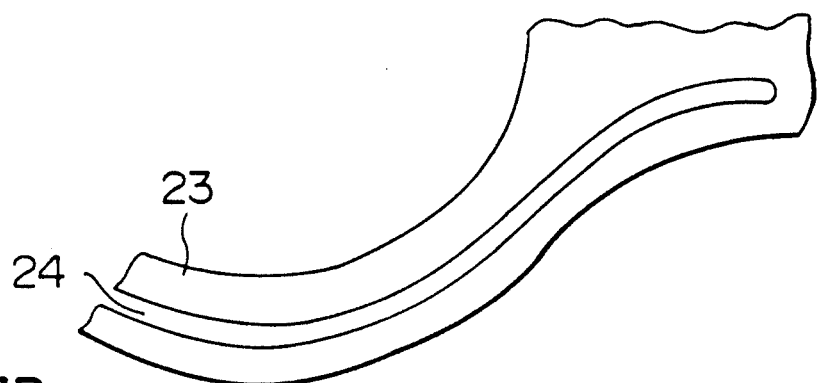
FIG. 13A is a plane view showing a part of guide plate for guiding the slide base of tape supplying side.
Figure 13B:
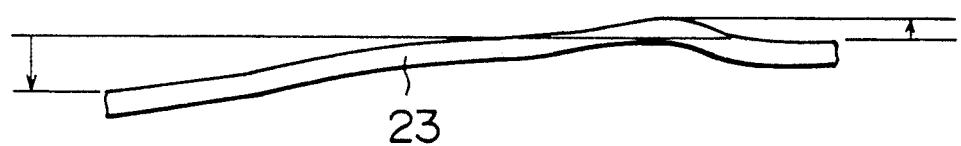
FIG. 13B is a side view showing a part of guide plate for guiding the slide base of tape supplying side.
Figure 14A:
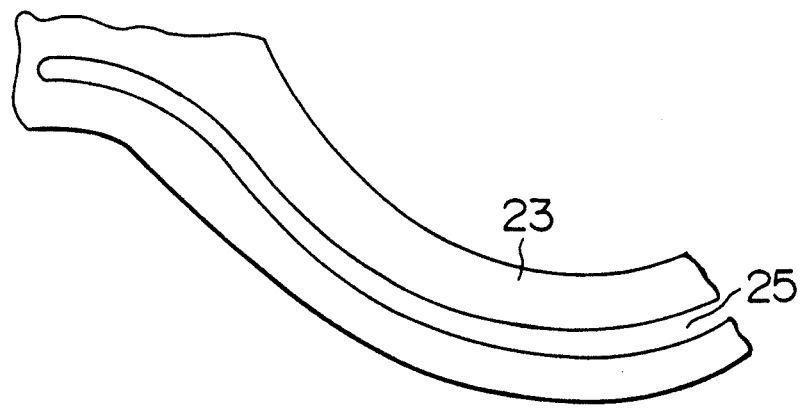
FIG. 14A is a plane view showing a part of guide plate for guiding the slide base of tape pulling side.
Figure 14B:
FIG. 14B is a side view showing a part of guide plate for guiding the slide base of tape pulling side.

FIG. 13A and FIG. 13B show a part of tape supplying side of the guide plate 23. On the guide plate 23 shown in FIG. 13A and FIG. 13B, when the slide base 19 moves from the right end of the guide groove 24 to the left end thereof so that the tape 6 is drawn out from the cassette 3, the slide base 19 guided on the guide plate 23 is moved at first to a slightly higher position in comparison with the initial position of the slide base 19 positioned at the right end of the guide groove 24 and subsequently is moved to a lower position in comparison with the initial position. FIG. 14A and FIG. 14B show a part of tape pulling side of the guide plate 23. On the guide plate 23 shown in FIG. 14A and FIG. 14B, when the slide base 21 moves from the left end of the guide groove 25 to the right end thereof so that the tape 6 is drawn out from the cassette 3, the slide base 21 guided on the guide plate 23 is moved at first to a slightly lower position in comparison with the initial position of the slide base 21 positioned at the left end of the guide groove 24 and subsequently is moved to a higher position in comparison with the initial position.

Figure 15:
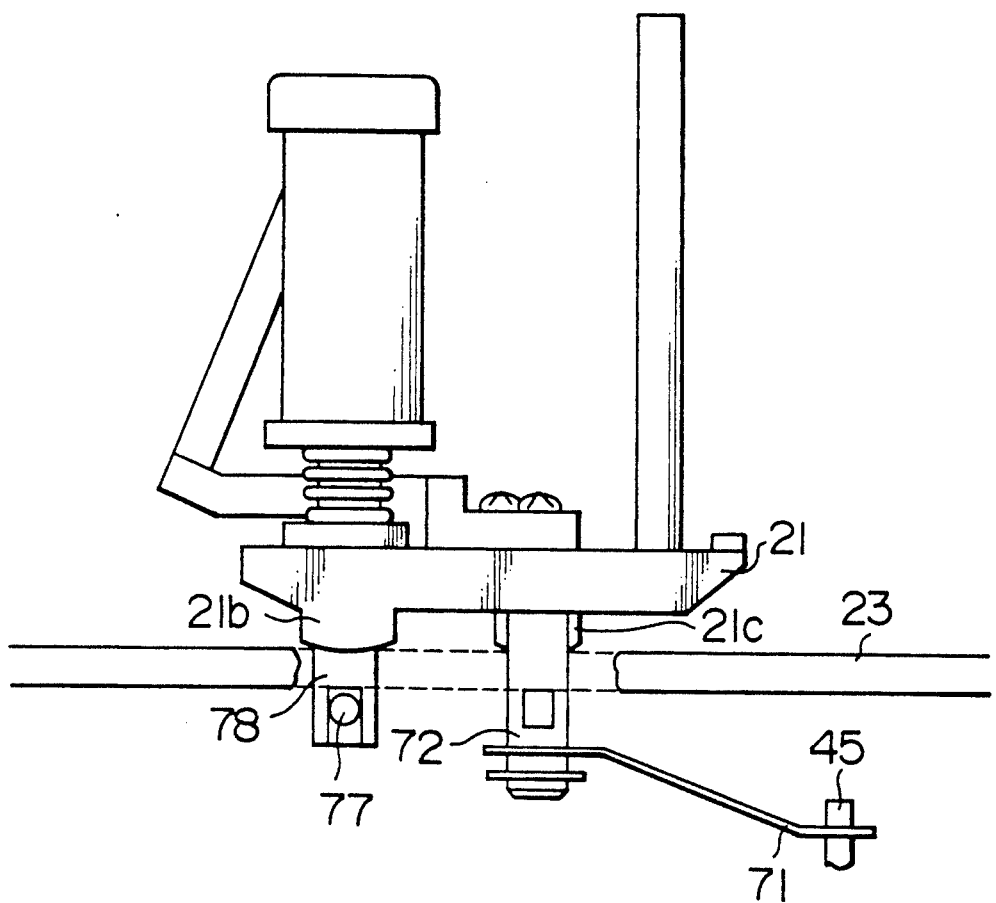
FIG. 15 is a side view showing a mechanism for guiding and driving the slide base of tape pulling side.
Figure 16:
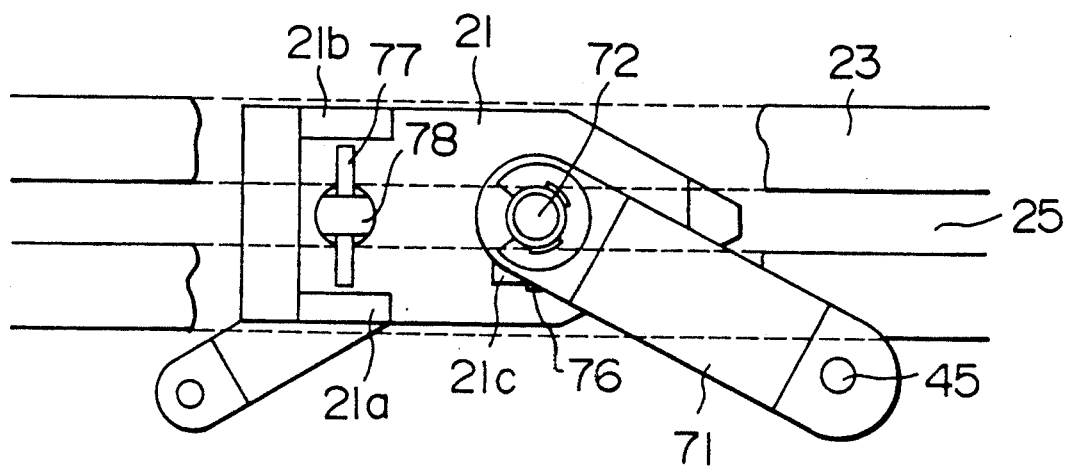
FIG. 16 is a plane view showing a mechanism for guiding and driving the slide base of tape pulling side.

In FIG. 15 and FIG. 16, a mechanism for guiding the slide base 21 or the guide plate 23 is shown. The guide plate 23 is arranged between the projections 21a, 21b and the pin 77 and between the projection 21c and the pin 76 so that the slide base 21 is guided on the guide plate 23. The slide base 21 is driven by the arm 71 for the tape loading operation. The shafts 72 and 78 are fi&ted in the guide groove 25 so that the moving path of the slide base 21 is limited.

Figure 17:
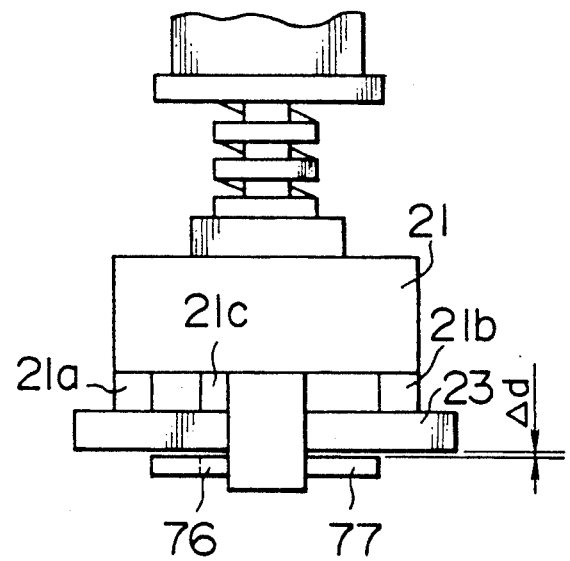
FIG. 17 is a side view showing a mechanism for guiding the slide base of tape pulling side.
Figure 18:
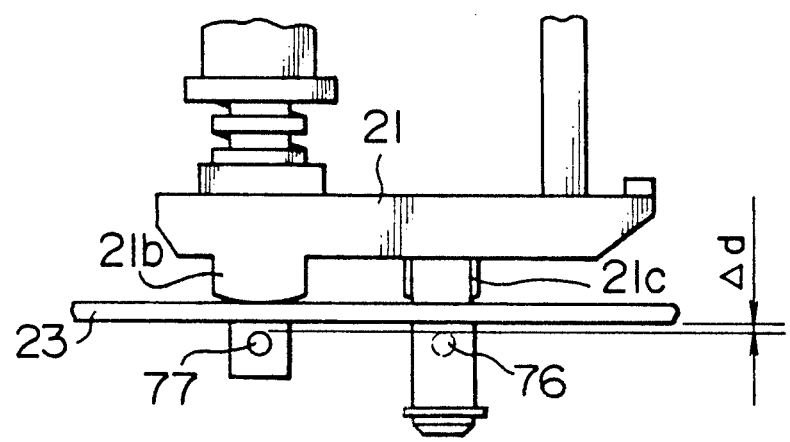
FIG. 18 is a side view showing a mechanism for guiding the slide base of tape pulling side.
Figure 19:
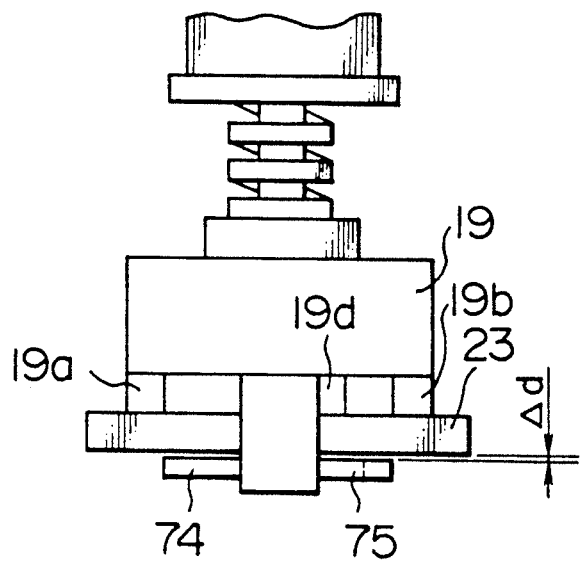
FIG. 19 is a side view showing a mechanism for guiding the slide base of tape supplying side.
Figure 20:
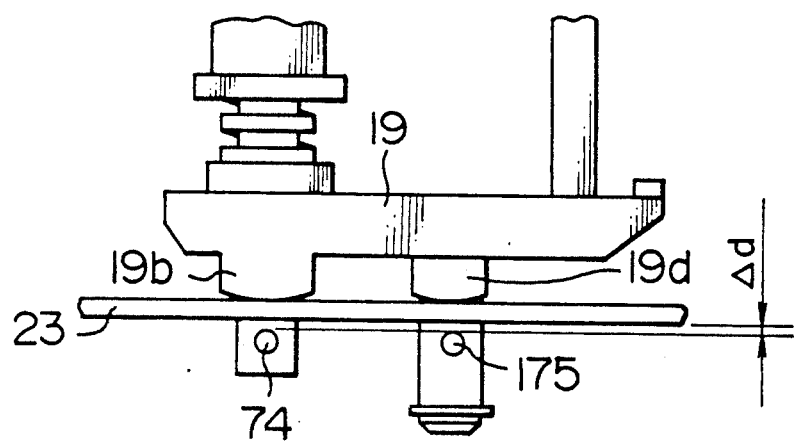
FIG. 20 is a side view showing a mechanism for guiding the slide base of tape supplying side.

Since the guide plate 23 has the curved guide surface as described above, the thickness of the guide plate 23 is smaller than the spaces between the projection 21a, 21b and the pin 77 and between the projection 21c and the pin 76 so that the clearance Δd is provided as shown in FIGS. 17 and 18. Therefore, the slide base 21 can slide smoothly. And since the slide base 21 is guided on the guide plate 23 through the three points of the projections 21a, 21b and 21c forming substantially an isosceles triangle, all of the three projections 21a, 21b and 21c can contact with the guide surface of the guide plate 23 so that the slide base 21 is correctly guided on the guide surface of the guide plate 23. Similarly, since the guide plate 23 has the curved guide surface as described above, the thickness of the guide plate 23 is smaller than the spaces between the projections 19a, 19b and the pin 74 and between the projection 19d and the pin 75 so that the clearance Δd is provided as shown in FIGS. 19 and 20. Therefore, the slide base 19 can slide smoothly. And since the slide base 19 is guided on the guide plate 23 through the three points of the projections 19a, 19b and 19d forming substantially an isosceles triangle, all of the three projections 19a, 19b and 19d can contact with the guide surface of the guide plate 23 so that the slide base 19 is correctly guided on the guide surface of the guide plate 23.

Figure 21:
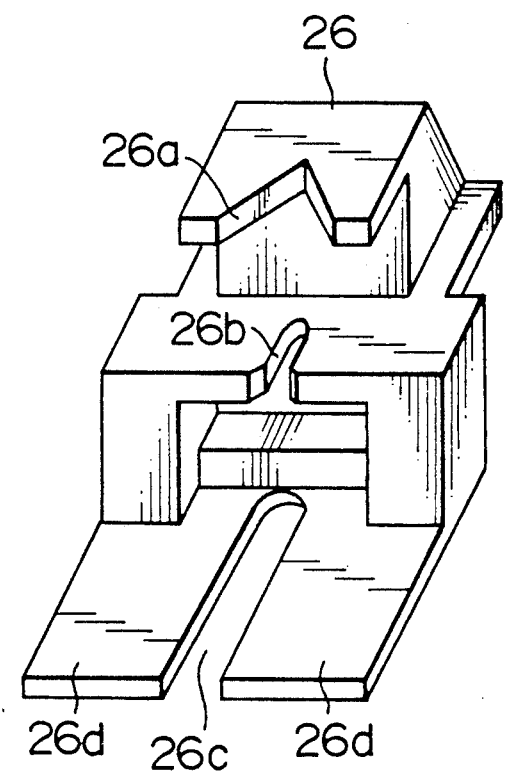
FIG. 21 is a perspective view showing a positioning member for fixing the slide base of tape supplying side.

A mechanism for fixing the slide bases 19 and 21 is described below. The tape supplying side positioning member 26 shown in FIG. 21 has a V-shaped groove 26a, two U-shaped grooves 26b, 26c, a mounting surface 26d and a vertical positioning surface 26e shown in FIG. 23. Similarly, the tape pulling side positioning member 27 shown in FIG. 24 has a V-shaped groove 27a, two U-shaped grooves 27b, 27c, a mounting surface 27d and a vertical positioning surface 27e shown in FIG. 26.

Figure 22:
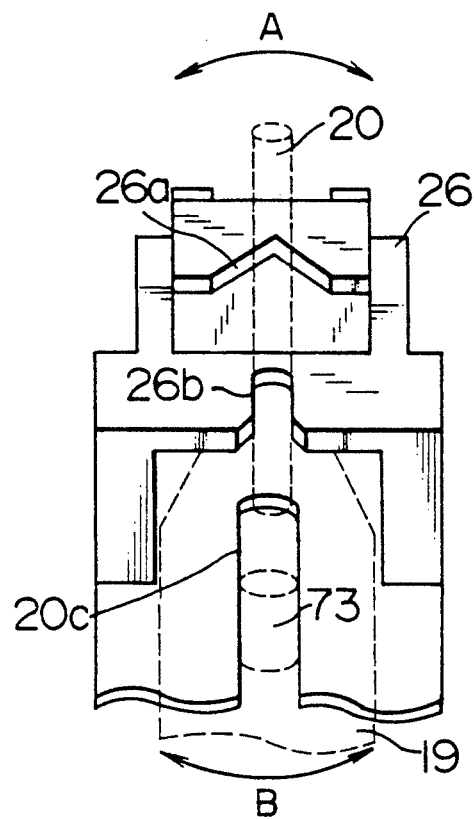
FIG. 22 is a perspective view showing a positioning method for fixing the slide base of tape supplying side.
Figure 23:
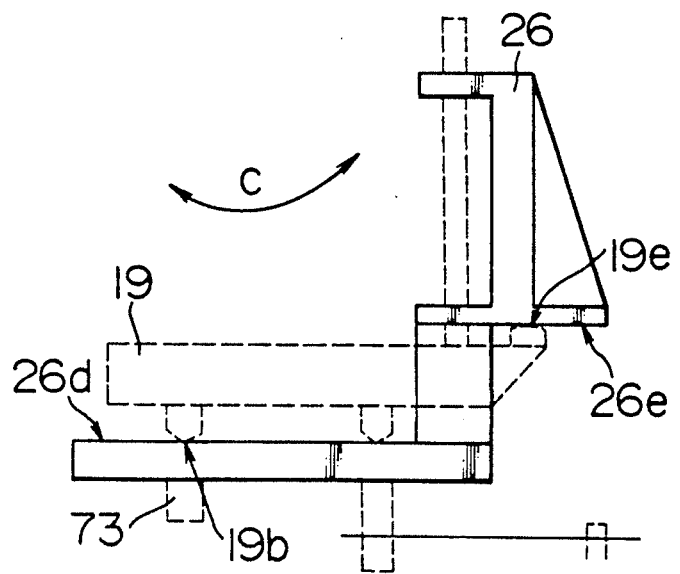
FIG. 23 is a side view showing a positioning method for fixing the slide base of tape supplying side.
Figure 24:
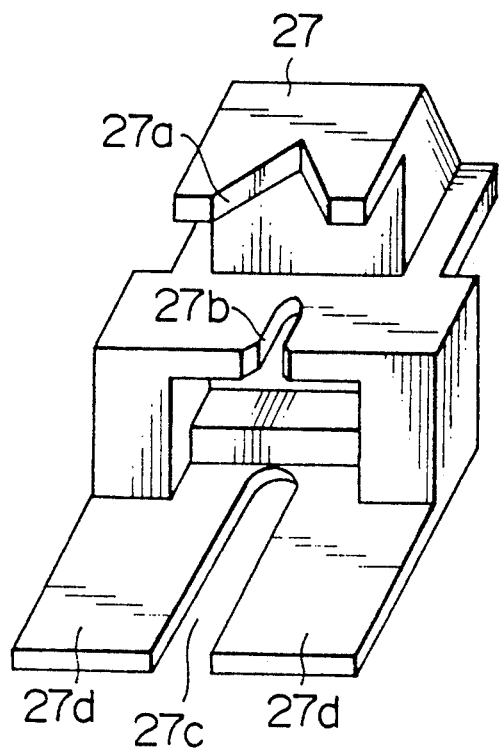
FIG. 24 is a perspective view showing a positioning member for fixing the slide base of tape pulling side.

As shown in FIG. 22, the pin 20 fixed on the slide base 19 engages with the V-shaped groove 26a and with the U-shaped groove 26b so that the rotation of the slide base 19 in the direction shown by an arrow A of the FIG. 22 is limited and the horizontal position of the slide base 19 is limited. The shaft 73 fixed on the lower surface of the slide base 19 engages with the U-shaped groove 26c so that the slide base 19 is prevented from rotating on the axis of the pin 20 in the direction shown by an arrow B of the FIG. 22. The projection 19e contacts with the vertical positioning surface 26e and the projection 19b contacts with the mounting surface 26d as shown in FIG. 23 so that the rotation of the slide base 19 in the direction shown by an arrow C of the FIG. 23 is limited. Therefore, the slide base 19 is fixed correctly on the positioning member 26.

Figure 25:
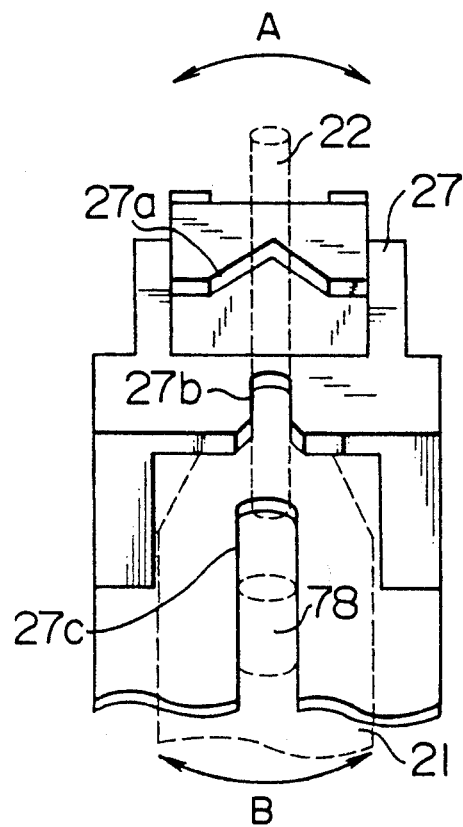
FIG. 25 is a perspective view showing a positioning method for fixing the slide base of tape pulling side.
Figure 26:
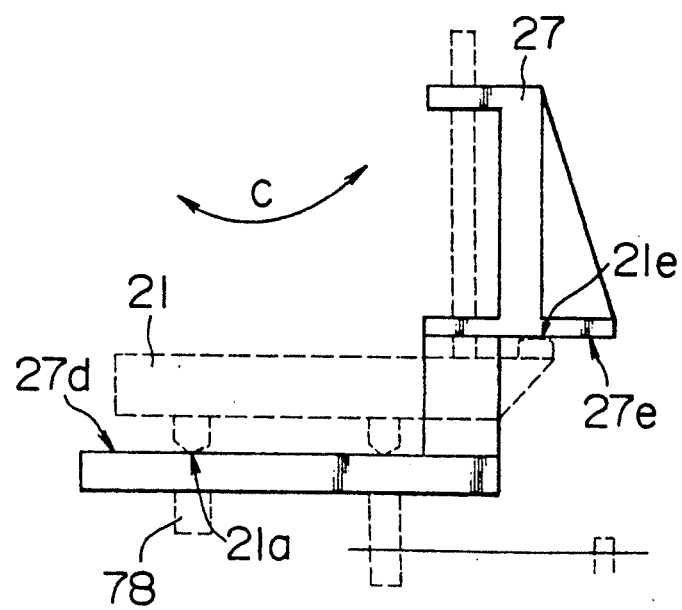
FIG. 26 is a side view showing a positioning method for fixing the slide base of tape pulling side.

As shown in FIG. 25, the pin 22 fixed on the slide base 21 engages with the V-shaped groove 27a and with the U-shaped groove 27b so that the rotation of the slide base 21 in the direction shown by an arrow A of the FIG. 25 is limited and the horizontal position of the slide base 21 in limited. The shaft 78 fixed on the lower surface of the slide base 21 engages with the U-shaped groove 27c so that the slide base 21 is prevented from rotating on the axis of the pin 22 in the direction shown by an arrow B of the FIG. 25. The projection 21e contacts with the vertical positioning surface 27e and the projection 21b contacts with the mounting surface 27d as shown in FIG. 26 so that the rotation of the slide base 21 in the direction shown by an arrow C of the FIG. 26 is limited. Therefore, the slide base 21 is fixed correctly on the positioning member 27.

The magnetic head drum according to the present invention is described below. As shown in FIG. 27, the magnetic head drum 2 has a lead edge 2a for positioning the tape 6. The height of the tape 6 is a difference between the vertical position of longitudinal axis of the tape 6 and the cassette base surface 3a. In general, the longitudinal axis of the tape 6 received in the cassette 3 forms substantially a tape datum plane 3b parallel to the cassette base surface 3a. The height of the tape 6 on the magnetic head drum 2 is varied in accordance with the inclination of the axis of the magnetic head drum 2. When both ends A, B of a contacting line 6X at which the longitudinal axis of the tape 6 arranged along the lead edge 2a contacts with the magnetic head drum 2 are arranged substantially on a plane parallel to the plane 3b, that is, the height H1 is equal to the height H2 as shown in FIG. 27, a difference between the maximum height of the tape and the minimum height of the tape 6 on the magnetic head drum 2, that is, a difference between the maximum height of the lead edge 2a and the minimum height of the lead edge 2a is small.

Figure 28:
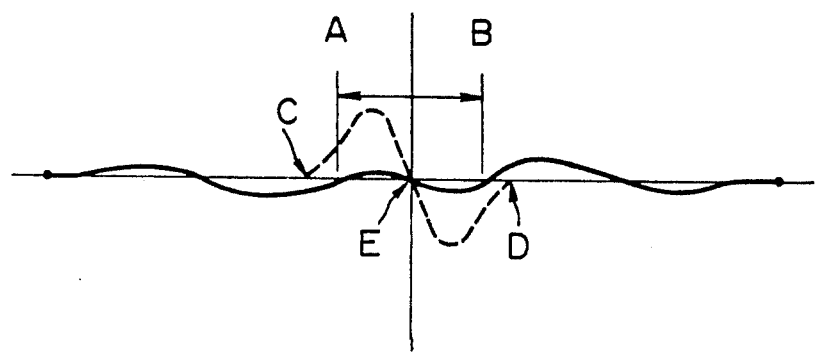
FIG. 28 is a diagram showing a height variation of tape in the tape loading apparatus according to the present invention and a height variation of tape in one of the conventional tape loading apparatuses.

In FIG. 28, a broken line shows a variation of height of the tape set by the conventional tape loading apparatus in which the tape is drawn out parallel to the cassette base surface from the cassette and the tape direction is changed at the tilted guide 14 and 15, that is, at a point C and a point D. In this case, a difference between the maximum height of the tape and the minimum height of the tape on the magnetic head drum is large on a tape-drum contacting range between A and B. Since the maximum height of the tape and the minimum height of the tape on the magnetic head drum are greatly different from the height of the tape in the cassette, there is possibility that the tape covers the lead edge and is damaged by the lead edge.

In the tape loading apparatus according to the present invention, since the difference between the maximum height of the lead edge 2a and the minimum height of the lead edge 2a, that is, the difference between the maximum height of the tape 6 and the minimum height of the tape 6 on the magnetic head drum 2 is small, it is not necessary for the attitude of tape to vary greatly when the tape 6 is guided along the lead edge 2a, so that the tape 6 is set correctly along the lead edge 2a. Therefore, damage to the tape is prevented.

As shown in FIG. 30, when the tape 6 is set on a half of circumference of the magnetic head drum 2, on the development showing the half of magnetic head drum contacting with the tape, a length of the half of circumference cf the magnetic head drum $= \pi D/2$, the lead edge 2 extends straightly, and a lead angle $\alpha$ is formed between a plane perpendicular to the axis of the magnetic head drum 2 and the lead edge 2.

When the positional difference in the direction of the axis between the points A and B of the ends of the lead edge of FIG. 30 is indicated by H, $$H = (\pi D/2)^* \tan\alpha.$$

When the magnetic head drum is inclined in a manner that the points A and B are arranged on a horizontal plane and an angle $\beta$ is formed between the axis of the magnetic head drum 2 and the vertical line, as shown in FIG. 31, $$H = D^* \tan\beta.$$

Consequently, the angle $\beta$ for the inclination of the magnetic head drum according to the present invention is determined as follows, $$\beta = \tan^{-1}[(\pi/2)^* \tan\alpha].$$

As shown in FIGS. 28 and 31, since in the vicinity of E point the tape 6 begins to contact with the magnetic head drum 2 during the tape setting operation, the tape held by the sliding tape guide 12 and tilted guide 14 of the tape supplying side is moved to the higher position in comparison with the E point and the tape held by the sliding tape guide 13 and tilted guide 15 of the tape pulling side is moved to the lower position in comparison with the E point so that an angle between the lead edge 2a and the tape 6 can decreased toward zero.

Figure 32:
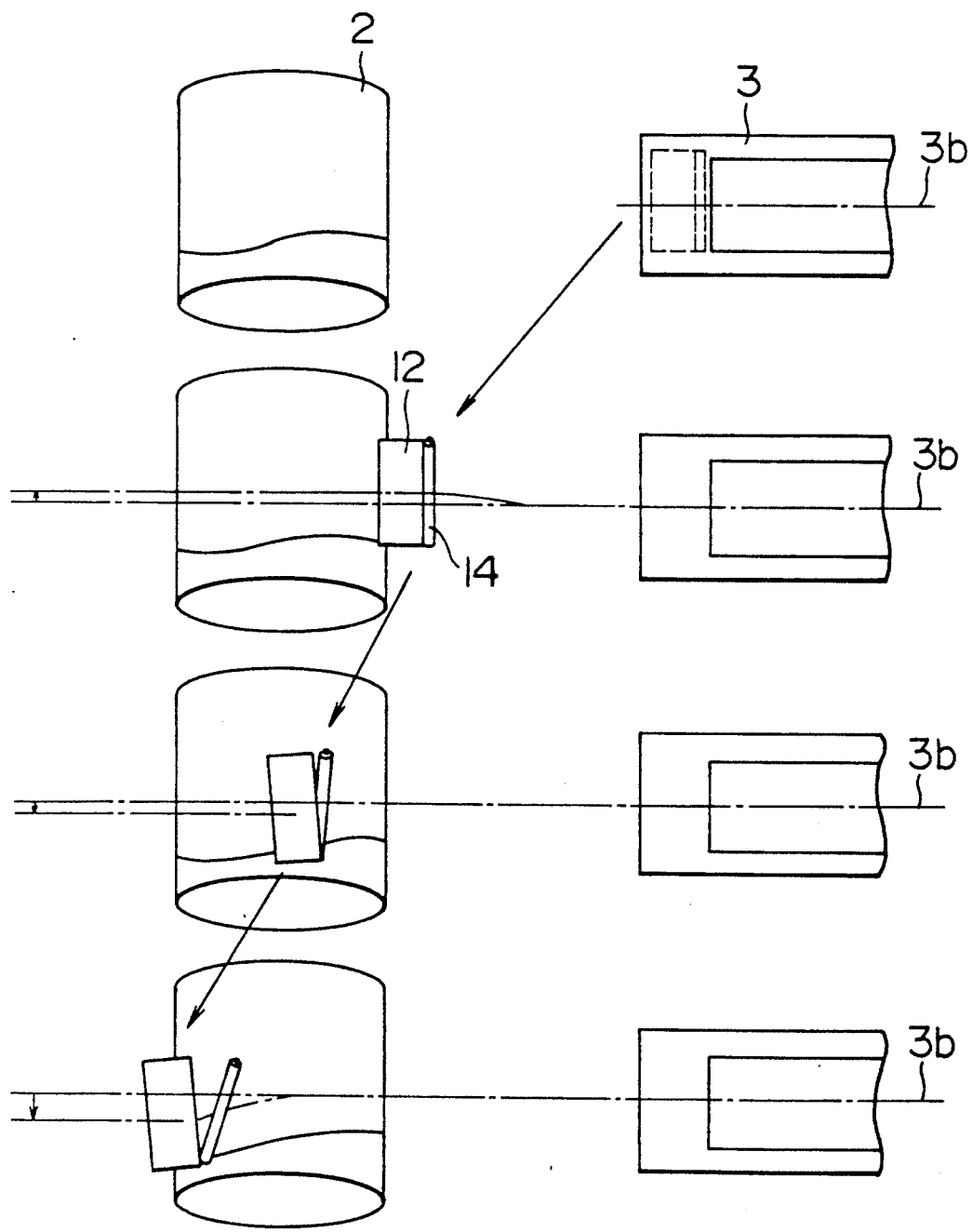
FIG. 32 includes schematic views each showing a height of a base plate of tape supplying side moving from the cassette to the positioning member.
Figure 33:
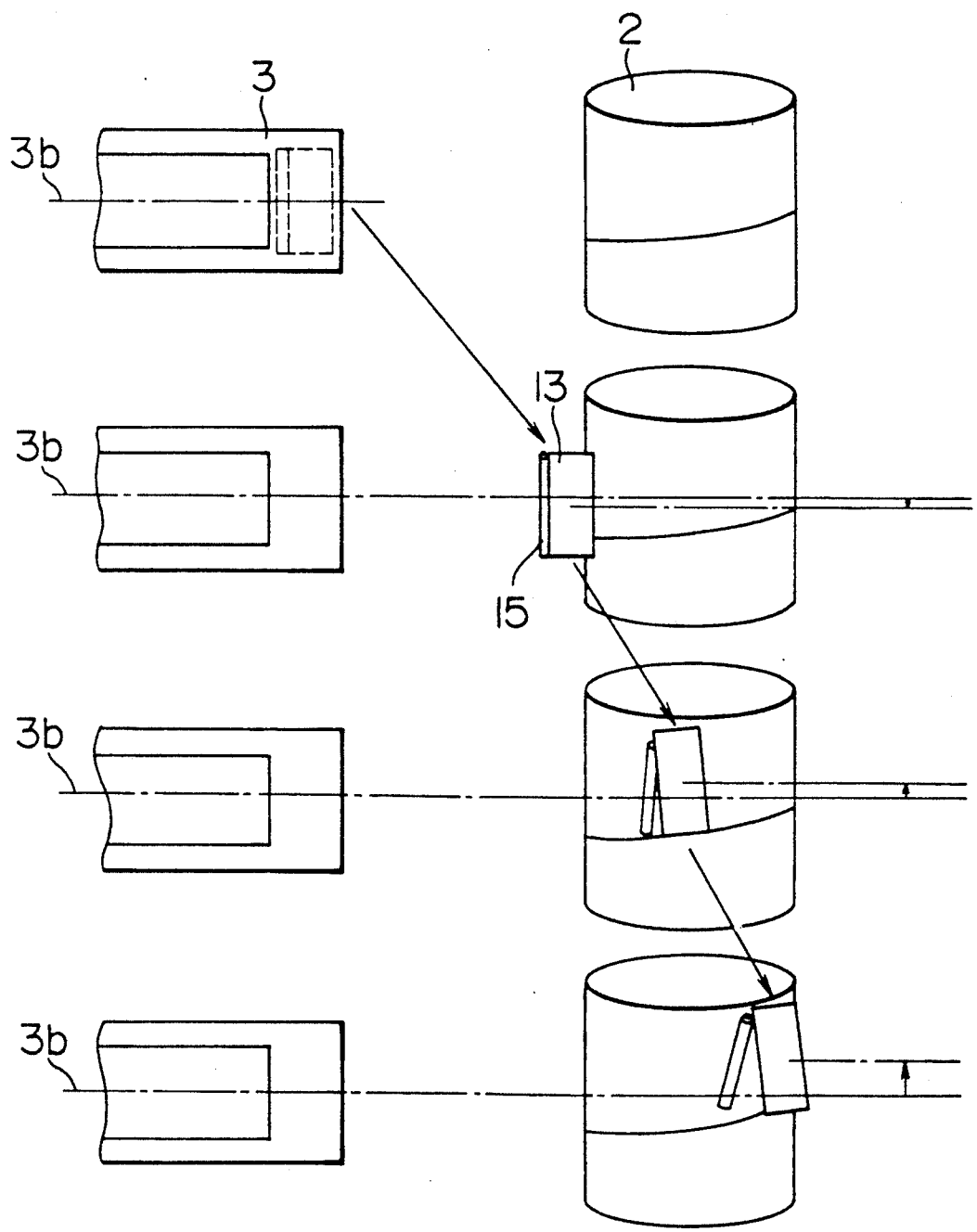
FIG. 33 includes schematic views each showing a height of a base plate of tape pulling side moving from the cassette to the positioning member.

As shown in FIG. 32 which shows the position variation of the tape held by the sliding tape guide 12 and tilted guide 14 during the tape setting operation, when the tape 6 begins to contact with the magnetic head drum 2 the tape held by the sliding tape guide 12 and tilted guide 14 is maintained at the higher position in comparison with the tape received in the cassette 3. Subsequently, the tape descends gradually as the tape setting operation goes on. As shown in FIG. 33 which shows the positional variation of the tape held by the sliding tape guide 13 and tilted guide 15 during the tape setting operation, when the tape 6 begins to contact with the magnetic head drum 2 the tape held by the sliding tape guide 13 and tilted guide 15 is maintained at the lower position in comparison with the tape received in the cassette 3. Subsequently, the tape ascends gradually as the tape setting operation goes on.

Figure 37:
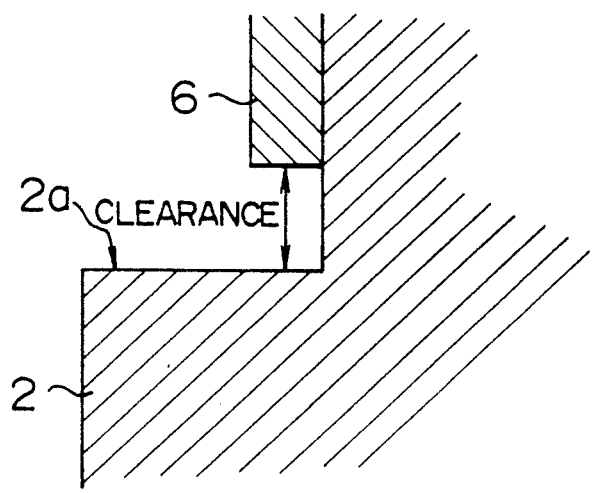
FIG. 37 is a sectional view showing an arrangement of tape and lead edge on a magnetic head drum.

And since the tape is damaged by the bend of tape, before the tape setting operation is completed, the sliding tape guides and tilted guides guide the tape along the lead edge with a clearance more than zero between the tape and the lead edge, so that the tape is prevented from covering the lead edge, as shown in FIG. 37.

Consequently, the angle between the lead edge 2a and the tape 6 can further decreased toward zero, and the bend of tape is prevented, so that the tape damage is prevented.

What is claimed is:

1. A tape loading apparatus comprising:
   a cassette including a videotape received in the cassette, the videotape having a longitudinal axis forming a tape datum plane in the cassette,
   a helical scanning type magnetic head drum having a cylindrical head drum surface and a lead edge, the videotape being set on the cylindrical head drum surface for scanning of the videotape, the lead edge maintaining a lead angle between the videotape and the magnetic head drum and limiting a vertical movement of the videotape on the cylindrical head drum surface, a tape-drum contacting axis formed by a contacting line at which the longitudinal axis of the videotape set along the lead edge contacts the cylindrical head drum surface after a videotape setting operation of the videotape on the cylindrical head drum surface is completed, and wherein both longitudinal ends of the tape drum contacting axis are arranged substantially on a plane parallel to the tape datum plane, and
   a videotape setting means for drawing out the videotape from the cassette, for guiding the videotape along the lead edge and for setting the videotape on the cylindrical head drum surface for enabling a scanning of the videotape.

2. A tape loading apparatus according to claim 1, wherein the videotape setting means guides the videotape along a lead edge with a clearance between the videotape and the lead edge before the videotape setting operation is completed, and wherein the clearance between the videotape and the lead edge is greater than zero.

3. A tape loading apparatus according to claim 1, wherein the tape setting means varies an attitude of the videotape guided onto the magnetic drum in accordance with an angle formed between the tape datum plane and the lead edge.

4. A tape loading apparatus according to claim 1, wherein the videotape setting means includes videotape guides for holding the videotape guided onto the magnetic drum, slide bases on which the videotape guides are fixed, and a guide plate for guiding the slide bases in accordance with a shape of the lead edge, and wherein each of the slide bases has three contact portions contacting the guide plates so that each of the slide bases is supported only through the three contact portions on the guide plate.

5. A tape loading apparatus according to claim 1, wherein the videotape setting means includes videotape guides for holding the videotape guided onto the magnetic drum, slide bases on which the videotape guides are fixed, a guide plate for guiding the slide bases in accordance with a shape of the lead edge, and compensating guides for controlling a position and attitude of the videotape between the slide bases and the cassette before a completion of the videotape setting operation.

* * * * *